United States Patent
Song et al.

(10) Patent No.: US 11,920,993 B1
(45) Date of Patent: Mar. 5, 2024

(54) MINIATURE COMBINED MULTI-AXIS FORCE SENSOR STRUCTURE

(71) Applicant: SOUTHEAST UNIVERSITY, Nanjing (CN)

(72) Inventors: Aiguo Song, Nanjing (CN); Jingjing Xu, Nanjing (CN); Shuyan Yang, Nanjing (CN); Baoguo Xu, Nanjing (CN); Huijun Li, Nanjing (CN); Ruqi Ma, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/025,186

(22) PCT Filed: May 12, 2022

(86) PCT No.: PCT/CN2022/092466
§ 371 (c)(1),
(2) Date: Mar. 8, 2023

(87) PCT Pub. No.: WO2023/206610
PCT Pub. Date: Nov. 2, 2023

(30) Foreign Application Priority Data

Apr. 26, 2022 (CN) .......................... 202210443754.9

(51) Int. Cl.
*G01L 1/18* (2006.01)
*G01L 5/1627* (2020.01)

(52) U.S. Cl.
CPC .............. *G01L 1/18* (2013.01); *G01L 5/1627* (2020.01)

(58) Field of Classification Search
CPC ......... G01L 5/162; G01L 1/205; G01L 5/226; G01L 5/1627; G01L 5/165; G01L 1/2293; G01L 1/142; G01L 1/20; G01L 1/2218; G01L 25/006; G01L 1/14; G01L 5/16; G01L 5/166; G01L 1/048; G01L 25/00; G01L 1/148; G01L 1/18; G01L 5/169; G01L 1/26; G01P 15/123; A61B 34/30
See application file for complete search history.

(56) References Cited

U.S. PATENT DOCUMENTS

2021/0404890 A1    12/2021    Kosaka et al.

FOREIGN PATENT DOCUMENTS

CN    2165435 Y    5/1994
CN    1425903 A    6/2003
(Continued)

*Primary Examiner* — Brandi N Hopkins
(74) *Attorney, Agent, or Firm* — Bayramoglu Law Offices LLC

(57) ABSTRACT

A miniature combined multi-axis force sensor structure includes a sensor body, a first shell and a second shell, two horizontal main beams and two vertical main beams are arranged on the periphery of an inner round platform in a cross shape, tail ends of the horizontal main beams and the vertical main beams are each connected to a vertical floating beam, and the horizontal floating beams consist of two thin-walled cambered beams; two ends of the horizontal floating beam are each connected to an outer round platform by means of an annular platform; the sensor body is arranged between the first shell and the second shell; strain gauges are stuck on the horizontal main beams and the vertical main beams to form two Wheatstone bridges; and when force/torque acts on the cross beam, the sensor deforms, and the resistance value of strain gauge at corresponding position changes.

2 Claims, 2 Drawing Sheets

(56) References Cited

FOREIGN PATENT DOCUMENTS

| | | | |
|---|---|---|---|
| CN | 103076131 | A | 5/2013 |
| CN | 107782482 | A | 3/2018 |
| CN | 109238528 | A | 1/2019 |
| CN | 110514341 | A | 11/2019 |
| CN | 111272328 | A | 6/2020 |
| CN | 113561163 | A | 10/2021 |

MINIATURE COMBINED MULTI-AXIS FORCE SENSOR STRUCTURE

CROSS REFERENCE TO THE RELATED APPLICATIONS

This application is the national phase entry of International Application No. PCT/CN2022/092466, filed on May 12, 2022, which is based upon and claims priority to Chinese Patent Application No. 202210443754.9, filed on Apr. 26, 2022, the entire contents of which are incorporated herein by reference.

TECHNICAL FIELD

The present disclosure belongs to the technical field of sensors, in particular to a miniature combined multi-axis force sensor structure.

BACKGROUND

Since multi-axis force sensors can simultaneously sense multi-axis force and torque components, and obtain complete force information in complex systems accordingly, they are widely used in intelligent robots, aerospace, automobiles and medical fields. As most medical apparatuses in the medical industry have a small size, there are tough requirements for the size of force sensors. At present, the modern development of acupuncture and moxibustion and teleoperation surgical machines have put forward an urgent demand for the research and application of miniature multi-axis force sensors, which causes miniaturization to become the primary problem faced by medical multi-axis force sensors.

A resistance strain multi-axis force sensor based on a cross-beam structure is most extensively used currently. A strain gauge converts deformation of the sensor into voltage change, and force and torque components are measured as a result. Recently, the miniature multi-axis force sensors are mostly manufactured by microfabrication process (MEMS) and integrated strain gauges, which leads to high cost, and makes it of great practical significance to improve the structure.

SUMMARY

To solve the above problems, the present disclosure discloses a miniature combined multi-axis force sensor structure, which has the advantages of high sensitivity and low inter-axial coupling, and is suitable for multi-axis force measurement in the medical field.

In order to solve the above problems, the present invention provides a miniature combined multi-axis force sensor structure, including a sensor body, a first shell and a second shell, wherein the sensor body includes horizontal main beams, vertical main beams, horizontal floating beams, vertical floating beams, an inner round platform, an outer round platform and strain gauges;

the horizontal main beams and the vertical main beams form a cross beam, the horizontal main beam is horizontally arranged, the horizontal main beam is perpendicular to the axis of the inner round platform, the vertical main beam is vertically arranged, and the vertical main beam is parallel to the axis of the inner round platform;

the horizontal main beams consist of two rectangular thin-walled beams, each thin-walled beam having a rectangular cross section, and central axes of lower surfaces of tail ends of the horizontal main beam are each connected to one vertical floating beam;

the vertical main beams consist of two rectangular thin-walled beams, each thin-walled beam having a rectangular cross section, top surfaces of tail ends of the vertical main beam are each connected to one vertical floating beam, and four main beams are arranged on the periphery of the inner round platform in a cross shape;

the horizontal floating beams consist of two thin-walled cambered beams, two ends of the horizontal beam are each connected to the outer round platform by means of an annular platform;

the vertical floating beams consist of four rectangular thin-walled beams; two vertical floating beams are connected to the horizontal main beam, and bottom ends of the two vertical floating beams are connected to a horizontal floating beam annular platform; inner surfaces of the other two vertical floating beams are connected to the vertical main beam, and bottom ends of the other two vertical floating beams are connected to the horizontal floating beam; and the main beams and the vertical floating beams form a T shape;

the inner round platform is of a hollowed cylindrical structure with a circular section, the hollowed structure is used for being connected to an acupuncture needle in a interference fit manner, force and torque act on the cross beam by means of the hollowed structure, the periphery of the inner round platform is connected to the main beams, and the strain gauges are stuck on a surface of the horizontal main beam and a surface of the vertical main beam;

the outer round platform is of a hollowed cylindrical structure with a circular section, and the side wall of the hollowed cylindrical structure is provided with four first fixing holes;

the sensor body is fixed between the first shell and the second shell by means of the first fixing holes, the side wall of the first cylindrical shell and the side wall of the second cylindrical shell are each provided with two second fixing holes corresponding to the first fixing holes, and an extension cylinder is arranged below the second shell.

The measuring principle of the miniature combined multi-axis force sensor structure is as follows, eight strain gauges are stuck on the horizontal main beams and the vertical main beams to form two Wheatstone bridges, four strain gauges are stuck on an upper surface and a lower surface of the horizontal main beams to form a bridge circuit sensitive to upper and lower resistance $F_Z$, four strain gauges are stuck on a side surface of the vertical main beams to form a bridge circuit sensitive to torsional torque $M_Z$, when force/torque acts on the cross beam, the sensor deforms, and the resistance value of strain gauge at corresponding position changes, causing an output voltage of a corresponding bridge to change, and a value of the force/torque can be obtained by measuring a variation of the voltage.

The present disclosure has the following beneficial effects:

(1) the miniature combined two-axis force sensor designed by the present disclosure is based on a principle of resistance strain, and a sensitive portion uses a rectangular thin-walled beam structure, such that bending deformation is large, and measurement sensitivity is effectively improved;

(2) the miniature combined two-axis force sensor designed by the present disclosure uses a combined structure of a vertical main beam and a horizontal main beam, and a force component and a torque component are induced on different main beams, such that an inter-axial coupling error is effectively reduced, and desirable measurement accuracy is achieved;

(3) the miniature combined two-axis force sensor designed by the present disclosure has a simple structure and a small size and is convenient to mount.

Figure 1:
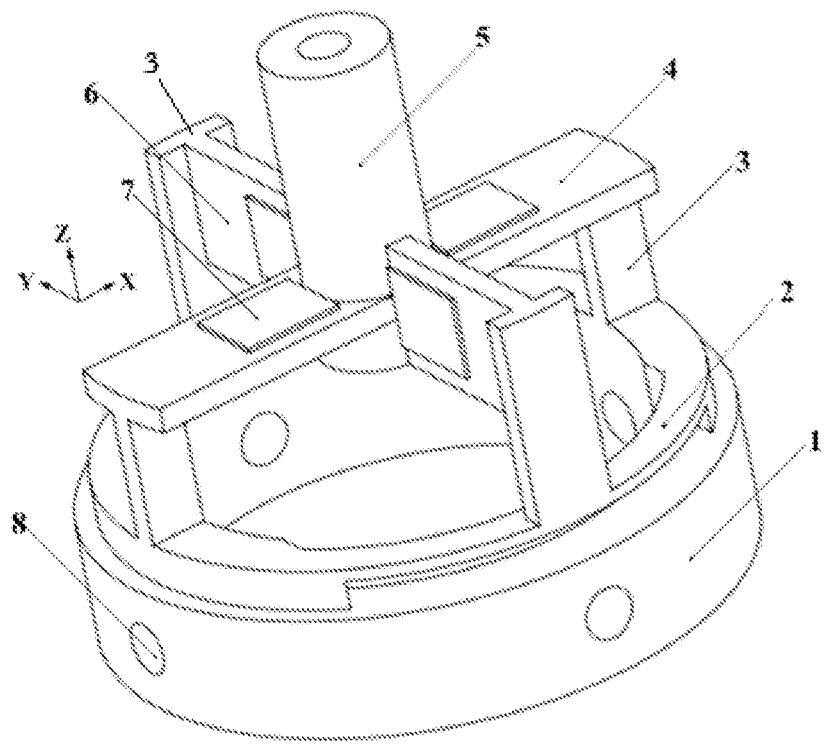
FIG. 1 is a schematic structural diagram without a shell according to the present disclosure.
Figure 2:
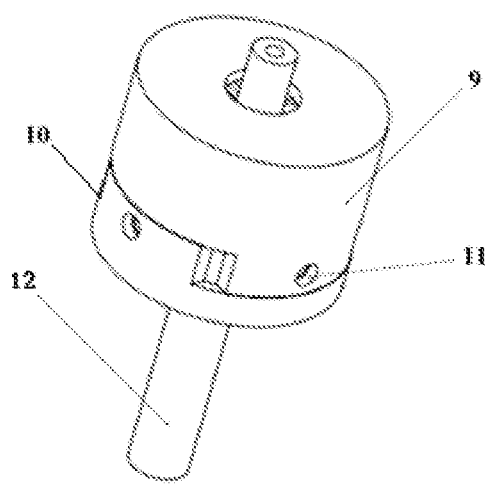
FIG. 2 is a schematic structural diagram with shells according to the present disclosure.

REFERENCE NUMERALS IN FIGURES 1. outer round platform, 2. horizontal floating beam, 3. vertical floating beam, 4. horizontal main beam, 5. inner round platform, 6. vertical main beam, 7. strain gauge, 8. first fixing hole, 9. first shell, 10. second shell, 11. second fixing hole, and 12. extension cylinder.

DETAILED DESCRIPTION OF THE EMBODIMENTS

The present disclosure will be further illustrated below with reference to accompanying drawings and specific embodiments, and it should be understood that the following specific embodiments are merely used to describe the present disclosure rather than not limit the scope of the present disclosure.

To describe a direction conveniently, a spatial Cartesian coordinate system is established as shown in FIG. 1.

The present disclosure provides a miniature combined two-axis force sensor structure. The miniature combined multi-axis force sensor structure includes a sensor body, a first shell 9 and a second shell 10, where the sensor body includes horizontal main beams 4, vertical main beams 6, horizontal floating beams 2, vertical floating beams 3, an inner round platform 5 and an outer round platform 1; the horizontal main beams 4 consist of two rectangular thin-walled beams, each thin-walled beam having a rectangular cross section, and central axes of lower surfaces of tail ends of the horizontal main beam 4 are each connected to one vertical floating beam 3; the vertical main beams 6 consist of two rectangular thin-walled beams, each thin-walled beam having a rectangular cross section, top surfaces of tail ends of the vertical main beam 6 are each connected to one vertical floating beam 3 (the two vertical floating beams are in different directions), and four main beams are arranged on the periphery of the inner round platform in a cross shape; the horizontal floating beams 2 consist of two thin-walled cambered beams, and two ends of the horizontal beam 2 are each connected to the outer round platform 1 by means of an annular platform; the vertical floating beams 3 consist of four rectangular thin-walled beams, two vertical floating beams 3 are connected to the horizontal main beam 4, and bottom ends of the two vertical floating beams are connected to an annular platform of the horizontal floating beam 2; inner surfaces of the other two vertical floating beams 3 are connected to the vertical main beam 6, and bottom ends of the other two vertical floating beams are connected to the horizontal floating beam 2; the main beams and the vertical floating beams form a T shape, the inner round platform 5 is of a hollowed cylindrical structure with a circular section, the hollowed structure is used for being connected to an acupuncture needle in a interference fit manner, and force and torque act on the cross beam by means of the hollowed structure; the periphery of the inner round platform 5 is connected to the main beams, the outer round platform 1 is of a hollowed cylindrical structure with a circular section, the side wall of the hollowed cylindrical structure is provided with four first fixing holes 8, and the sensor body is fixed between the first shell 9 and the second shell 10 by means of the first fixing holes 8; and the side wall of the first cylindrical shell 9 and the side wall of the second cylindrical shell 10 are each provided with two second fixing holes 11 corresponding to the first fixing holes 8, and an extension cylinder (circuits are arranged inside, serving as a handle during use) is arranged below the second shell 10.

Figure 3:
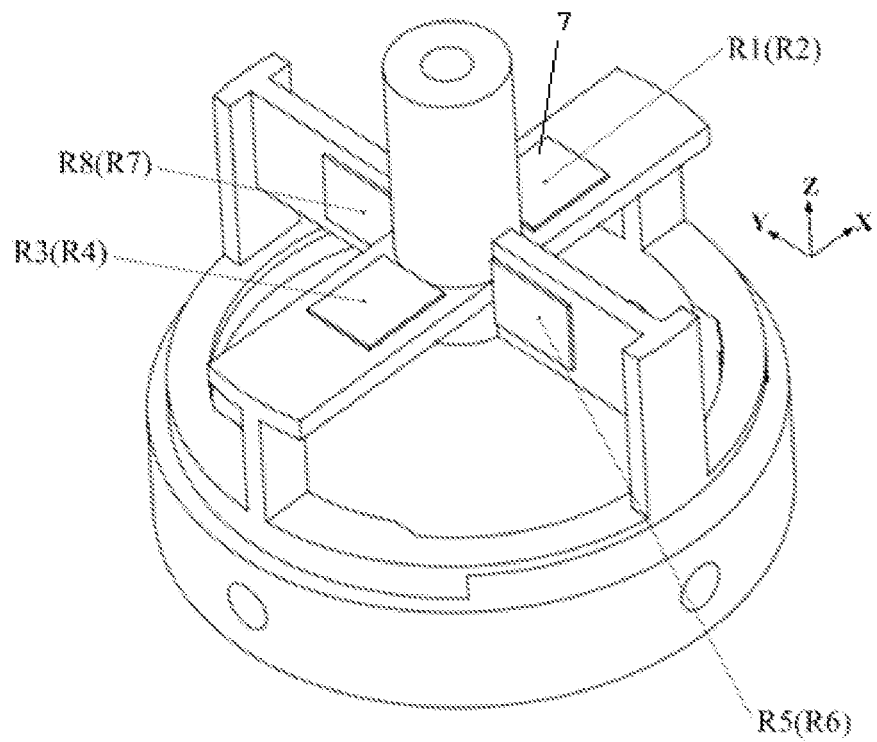
FIG. 3 is a schematic diagram of a position for sticking strain gauges according to the present disclosure.

FIG. 3 shows positions for sticking eight strain gauges in total and corresponding numbers R1 to R8 according to the present disclosure. All strain gauges are identical except for the numbers, that is, the strain gauges have the same initial resistance, and the resistance value decreases during contraction and increases during extension. The strain gauges are stuck on positions with maximum strain when each main beam is stressed. Strain gauges R1 and R2 are stuck on an upper surface and a lower surface of a rectangular thin-walled beam in the X positive direction of the horizontal main beam, strain gauges R3 and R4 are stuck on an upper surface and a lower surface of the rectangular thin-walled beam in the X negative direction of the horizontal main beam, strain gauges R5 and R6 are stuck on a left side wall and a right side wall of a rectangular thin-walled beam in the Y negative direction of the vertical main beam, strain gauges R7 and R8 are stuck on a left side wall and a right side wall of a rectangular thin-walled beam in the Y positive direction of the vertical main beam, and all strain gauges are stuck on the positions with the maximum strain when each beam is stressed.

Figure 4:
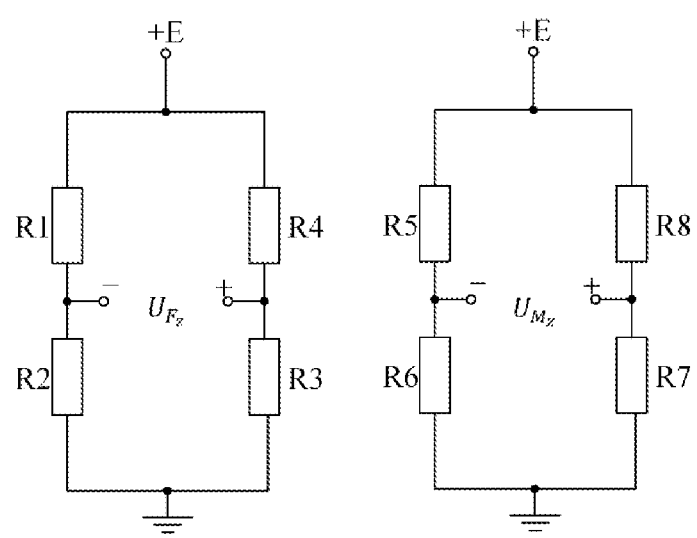
FIG. 4 is a schematic diagram of two bridge circuits according to the present disclosure.

FIG. 4 shows two Wheatstone bridges consisting of strain gauges in two channels. Strain gauges R1, R2, R3 and R4 form a Wheatstone bridge for measuring action force $F_Z$ in the Z direction. Strain gauges R5, R6, R7 and R8 form a Wheatstone bridge for measuring action moment $M_Z$ in the Z direction.

According to a measurement principle of the two-axis force sensor, input force/torque of a certain axis acts on the center of the cross beam composed of the horizontal main beams 4 and the vertical main beams 6 by means of the hollowed structure of the inner round platform 5, such that the sensor is deformed, a resistance of the strain gauge at a corresponding position changes, and an output voltage of a corresponding bridge is caused to change. In this case, due to structure design, output voltages of other axes may not change apparently, thereby effectively reducing the inter-axial coupling interference, and improving measurement accuracy of the sensor. Therefore, in use, a force/torque value of each axis may be obtained merely by measuring a voltage variation of two channels. Let R0 represent a resistance of a zero position of the strain gauge, and $\Delta R_{F_z}$ and $\Delta R_{M_z}$ represent resistance variations of the strain gauge under the action of $F_Z$ and $M_Z$. The variation of the output voltage of each channel is as follows:

$$\Delta U_{F_z} = \frac{R3 + \Delta R_{F_z}}{R3 + R4} - \frac{R2 + \Delta R_{F_z}}{R1 + R2} = \frac{R0 + \Delta R_{F_z}}{2R0} - \frac{R0 - \Delta R_{F_z}}{2R0} = \frac{\Delta R_{F_z}}{R0} E$$

$$\Delta U_{M_z} = \frac{R7 + \Delta R_{M_z}}{R7 + R8} - \frac{R6 + \Delta R_{M_z}}{R5 + R6} = \frac{R0 + \Delta R_{M_z}}{2R0} - \frac{R0 - \Delta R_{M_z}}{2R0} = \frac{\Delta R_{M_z}}{R0} E$$

It shall be noted that what is described above is merely about technical ideas of present disclosure, and shall be not regarded as limitation to the protection scope of the present disclosure. For those of ordinary skill in the art, several improvements and modification can be made on the premise without deviating from a principle of the present disclosure, and these improvements and modification shall fall within the protection scope of the claims of the present disclosure.

What is claimed is:

1. A miniature combined multi-axis force sensor structure, comprising a sensor body, a first shell and a second shell, wherein the sensor body comprises horizontal main beams, vertical main beams, horizontal floating beams, vertical floating beams, an inner round platform, an outer round platform and strain gauges;
    the horizontal main beam and the vertical main beam form a cross beam, the horizontal main beam is horizontally arranged, the horizontal main beam is perpendicular to an axis of the inner round platform, the vertical main beam is vertically arranged, and the vertical main beam is parallel to the axis of the inner round platform;
    the horizontal main beams consist of two rectangular thin-walled beams, each thin-walled beam having a rectangular cross section, and central axes of lower surfaces of tail ends of the horizontal main beam are each connected to one vertical floating beam;
    the vertical main beams consist of two rectangular thin-walled beams, each thin-walled beam having a rectangular cross section, top surfaces of tail ends of the vertical main beam are each connected to one vertical floating beam, and four main beams are arranged on a periphery of the inner round platform in a cross shape;
    the horizontal floating beams consist of two thin-walled cambered beams, two ends of the horizontal floating beam are each connected to the outer round platform by means of an annular platform;
    the vertical floating beams consist of four rectangular thin-walled beams; two vertical floating beams are connected to the horizontal main beam, and bottom ends of the two vertical floating beams are connected to a horizontal floating beam annular platform; inner surfaces of the other two vertical floating beams are connected to the vertical main beam, and bottom ends of the other two vertical floating beams are connected to the horizontal floating beam; and the main beams and the vertical floating beams form a T shape;
    the inner round platform is of a hollowed cylindrical structure with a circular section, the hollowed structure is used for being connected to an acupuncture needle in a interference fit manner, and a force and a torque act on the cross beam by means of the hollowed structure, the periphery of the inner round platform is connected to the main beams, and the strain gauges are stuck on a surface of the horizontal main beams and a surface of the vertical main beams;
    the outer round platform is of a hollowed cylindrical structure with a circular section, and a side wall of the hollowed cylindrical structure is provided with four first fixing holes;
    the sensor body is fixed between the first shell and the second shell by means of the first fixing holes, the a side wall of the first cylindrical shell and the a side wall of the second cylindrical shell are each provided with two second fixing holes corresponding to the first fixing holes, and an extension cylinder is arranged below the second shell.

2. A measuring principle of the miniature combined multi-axis force sensor structure according to claim 1, wherein eight strain gauges are stuck on the horizontal main beams and the vertical main beams to form two Wheatstone bridges, four strain gauges are stuck on an upper surface and a lower surface of the horizontal main beams to form a bridge circuit sensitive to an upper and lower resistance $F_z$, four strain gauges are stuck on a side surface of the vertical main beams to form a bridge circuit sensitive to a torsional torque $M_z$, when force/torque acts on the cross beam, the sensor deforms, and a resistance value of the strain gauge at corresponding position changes, causing an output voltage of a corresponding bridge to change, and a value of the force/torque can be obtained by measuring a variation of the voltage.

* * * * *